United States Patent
Oki et al.

(10) Patent No.: US 9,811,747 B2
(45) Date of Patent: Nov. 7, 2017

(54) TRAFFIC LIGHT DETECTING DEVICE AND TRAFFIC LIGHT DETECTING METHOD

(71) Applicant: Nissan Motor Co., Ltd., Yokohama-Shi, Kanagawa (JP)

(72) Inventors: Takahiko Oki, Kanagawa (JP); Hidekazu Nishiuchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/122,549

(22) PCT Filed: Mar. 10, 2014

(86) PCT No.: PCT/JP2014/056196
§ 371 (c)(1),
(2) Date: Aug. 30, 2016

(87) PCT Pub. No.: WO2015/136602
PCT Pub. Date: Sep. 17, 2015

(65) Prior Publication Data
US 2017/0103274 A1    Apr. 13, 2017

(51) Int. Cl.
*H04N 7/18*    (2006.01)
*G06K 9/00*    (2006.01)

(52) U.S. Cl.
CPC ......... *G06K 9/00825* (2013.01); *H04N 7/183* (2013.01)

(58) Field of Classification Search
CPC ................................................. G06K 9/00825
See application file for complete search history.

(56) References Cited

U.S. PATENT DOCUMENTS

| | | | | |
|---|---|---|---|---|
| 2006/0239558 A1* | 10/2006 | Rafii | .............. | G06K 9/00201 382/181 |
| 2008/0186514 A1* | 8/2008 | Uffenkamp | ........ | G01B 11/2513 356/623 |
| 2012/0307065 A1* | 12/2012 | Mimeault | ............... | G08G 1/04 348/149 |
| 2013/0279491 A1* | 10/2013 | Rubin | ................... | G08G 1/166 370/347 |

FOREIGN PATENT DOCUMENTS

| | | |
|---|---|---|
| JP | 2005301518 A | 10/2005 |
| JP | 2007286943 A | 11/2007 |
| JP | 2008134916 A | 6/2008 |
| JP | 2008293277 A | 12/2008 |

* cited by examiner

*Primary Examiner* — Tracy Y Li
(74) *Attorney, Agent, or Firm* — Young Basile Hanlon & MacFarlane, P.C.

(57) ABSTRACT

A traffic light detecting device includes a camera capturing an image in the travelling direction of a vehicle, and a traffic light detecting unit detecting a traffic light from the image. The unit sets reference signals the number of which is a multiple of three, and phases of which are shifted each other by a time obtained by dividing a cycle of an alternating current power supplied to the traffic light by the multiple of three, and adjusts a phase of the reference signal which is closest to the phase of the alternating current power, to the phase thereof. The unit extracts from the image a synchronized pixel with a luminance which varies in synchronization with the reference signal having the phase adjusted to the phase thereof, and judges that a traffic light is present at a position of the synchronized pixel.

7 Claims, 9 Drawing Sheets

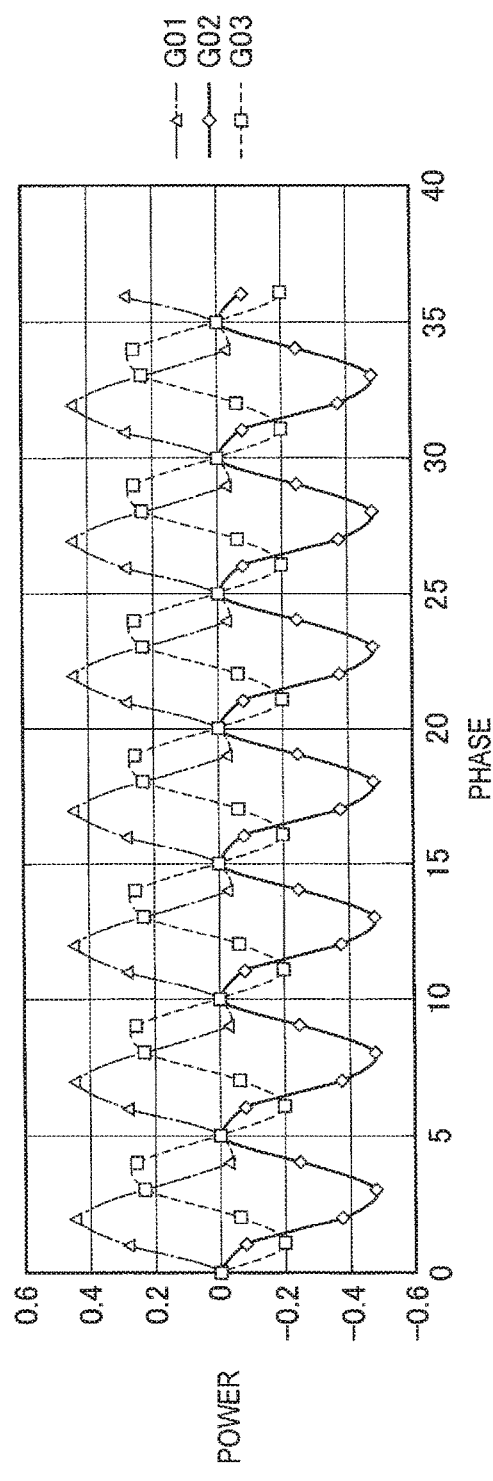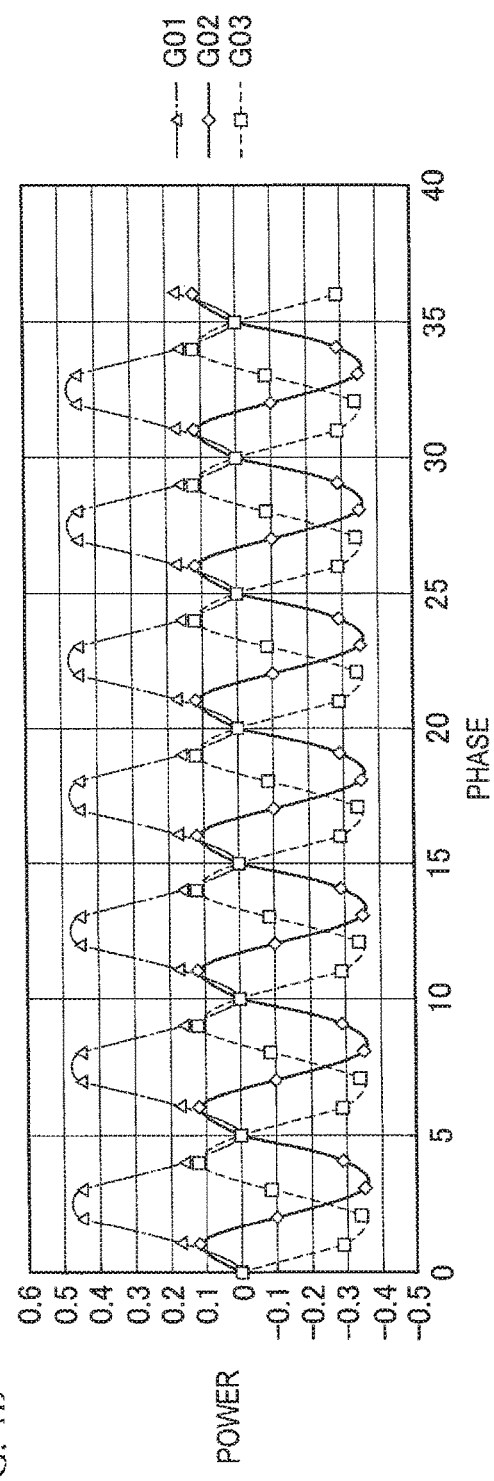
FIG. 4A
FIG. 4B

TRAFFIC LIGHT DETECTING DEVICE AND TRAFFIC LIGHT DETECTING METHOD

TECHNICAL FIELD

The present invention relates to a traffic light detecting device and a traffic light detecting method.

BACKGROUND

There have been heretofore known a traffic light detecting device for detecting a traffic light from an image captured by a camera (see Japanese Patent Application Publication No. 2005-301518). According to Japanese Patent Application Publication No. 2005-301518, a portion indicating a color of a signal lamp is extracted from the image, the circularity indicating how close to a perfect circle the extracted portion is calculated, and a portion having a higher circularity is detected as a candidate for the signal lamp.

To be detected as a candidate for a signal lamp, the extracted portion needs to have an image size large enough for the circularity to be determined. Thus, the technique in Japanese Patent Application Publication No. 2005-301518 has a difficulty in accurately detecting a distant traffic light the image size of which is too small to determine the circularity.

SUMMARY

The present invention has been made in view of the above problem, and an object thereof is to provide a traffic light detecting device and a traffic light detecting method capable of detecting even a distant traffic light with high accuracy.

A traffic light detecting device according to an aspect of the present invention includes an image capturing unit configured to capture an image in the travelling direction of a vehicle, and a traffic light detecting unit configured to detect a traffic light from the image. The traffic light detecting unit includes a reference signal generating unit configured to set reference signals the number of which is a multiple of three, and phases of which are shifted each other by a time obtained by dividing a cycle of an alternating current power supplied to the traffic light by the multiple of three, and a phase adjusting unit configured to adjust a phase of a reference signal of the reference signals the number of which is the multiple of three, the phase of the reference signal being closest to the phase of the alternating current power, to the phase of the alternating current power. The traffic light detecting unit extracts from the image a synchronized pixel with a luminance which varies in synchronization with the reference signal having the phase adjusted to the phase of the alternating current power, and judges that the traffic light is present at a position of the synchronized pixel.

BRIEF DESCRIPTION OF THE DRAWINGS

FIGS. 4(a) and (b) are graphs illustrating luminance variations of synchronized images (G01, G02, G03), with FIG. 4(a) illustrating a case where there is a deviation between the phase of a selected reference signal and the phase of the alternating current power supplied to a traffic light and FIG. 4(b) illustrating a case the phase of the selected reference signal matches that of the alternating current power supplied to the traffic light;

DETAILED DESCRIPTION OF THE EMBODIMENTS

Figure 1:
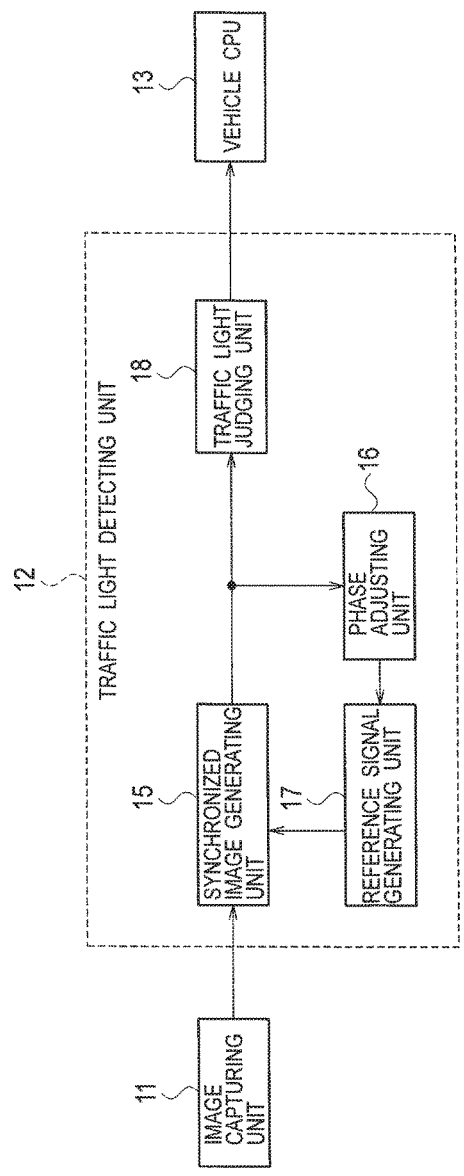
FIG. 1 is a block diagram illustrating an overall configuration of a traffic light detecting device according to an embodiment of the present invention.

With reference to the drawings, descriptions will be provided for an embodiment. In the drawings, the same parts are denoted by the same reference signs, and descriptions thereof are omitted.

With reference to FIG. 1, description will be provided for an overall configuration of a traffic light detecting device according to the embodiment. The traffic light detecting device is mounted on a vehicle and includes an image capturing unit 11 for capturing an image in the travelling direction of the vehicle and a traffic light detecting unit 12 for detecting a traffic light from the image acquired by the image capturing unit 11.

The image capturing unit 11 is a digital camera using a solid-state image sensor, for example, CCD or CMOS, which acquires a digital image for which an image processing can be performed. The digital camera includes a wide-angle lens having a wide angle of view. The imaging range (angle of view) of the image capturing unit 11 includes the travel direction of the vehicle and road shoulders in the right and left directions in the vicinity of the vehicle. The image capturing unit 11 captures an image repeatedly with predetermined time intervals and acquires a series of multiple images (frames).

The traffic light detecting unit 12 receives the images (hereinafter referred to as "camera images") acquired by the image capturing unit 11 and detects a position of a traffic light in the camera images. The positional information of a detected traffic light is transferred to another processing operation device (vehicle CPU 13) mounted on the vehicle, which includes, for example, a controller to perform automated driving of the vehicle. The traffic light detecting unit 12 includes a microcontroller including, for example, a CPU, a memory, and an input/output unit, which serves as multiple information processing units included in the traffic light detecting device by executing a computer program installed in advance. The traffic light detecting unit 12 repeatedly performs a series of information processes for each series of the multiple camera images (frames) to detect the position of a traffic light from the camera images. The traffic light detecting unit 12 may be included in an ECU which is also used for another control of the vehicle.

The multiple information processing units serving as the traffic light detecting unit 12 includes a synchronized image generating unit 15, a phase adjusting unit 16, a reference signal generating unit 17, and a traffic light judging unit 18. The reference signal generating unit 17 sets reference signals the number of which is a multiple of three and the phases of which are shifted each other by a time obtained by dividing the cycle of the alternating current power supplied to traffic lights by the multiple of three. The phase adjusting unit 16 adjusts the phase of the reference signal, which is one of the reference signals of the multiple of three and the phase of which is closest to the phase of the alternating current power, to the phase of the alternating current power. Details of the reference signal generating unit 17 and the phase adjusting unit 16 will be described later with reference to FIGS. 2 to 4.

The synchronized image generating unit 15 extracts from the camera images a synchronized pixel with a luminance which varies in synchronization with the reference signal the phase of which has been adjusted to that of the alternating current power, and generates synchronized images including the extracted synchronized pixel. For example, the synchronized image generating unit 15 performs a synchronization detection process of multiplying the reference signal the phase of which has been adjusted to that of the alternating current power and a luminance signal of each pixel of the camera images. From this process, a synchronized pixel with a luminance which varies in synchronization with the cycle of the alternating current power supplied to the traffic lights is extracted.

The alternating current power supplied to the traffic lights is an alternating current power obtained by full-wave rectifying the electric power of the commercial power supply. The luminance of a signal lamp which lights by receiving the supply of the electric power from the commercial power supply varies in the same cycle as the cycle (for example, 100 Hz) of the full-wave rectified alternating current power. For this reason, it is possible to detect the signal lamp which lights by receiving the electric power from the commercial power supply by extracting from the camera images a synchronized pixel with a luminance which varies in synchronization with the cycle of the alternating current power supplied to the traffic lights. Details of the synchronized image generating unit 15 will be described later with reference to FIG. 2.

The traffic light judging unit 18 judges whether or not a traffic light is present at the position of the synchronized pixel extracted by the synchronized image generating unit 15 based on the hue of the synchronized pixel. Specifically, the traffic light judging unit 18 judges whether or not the hue of the synchronized pixel is similar to that of a signal color. The traffic light judging unit 18 judges that a traffic light is present at the position of the synchronized pixel when the hue of the synchronized pixel is similar to that of a signal color.

Electric lights which light by receiving the supply of the electric power from the commercial power supply include not only signal lamps of the traffic lights but also other electric lights which light on the road, such as a streetlight 31$a$, a vending machine 31$b$, and a signboard 31$c$. The synchronized pixels extracted by the synchronized image generating unit 15 may include one extracted from these other electric lights. By the traffic light judging unit 18 judging the similarity in hue between the synchronized pixels and the signal colors, it is possible to exclude these other electric lights from an extraction result made by the synchronized image generating unit 15.

Here, the traffic light judging unit 18 may be configured to judge whether or not a traffic light is present using the position on the images and the luminance of the synchronized pixel, instead of using a hue judging unit which judges whether or not the hue of the synchronized pixel is similar to that of a signal color. By determining positions of traffic lights on the images from map information on the surroundings of the vehicle and matching the determined positions with that of the synchronized pixel, it is possible to exclude these other electrical lights. In addition, by estimating the luminance of a traffic light on the images from the distance from the vehicle to the traffic light, it is also possible to judge that the traffic light is present at a synchronized pixel having the luminance within the estimation.

The traffic light detecting unit 12 outputs to the vehicle CPU 13 the positional information of the synchronized pixel at which the traffic light judging unit 18 judges that a traffic light is present.

Figure 2:
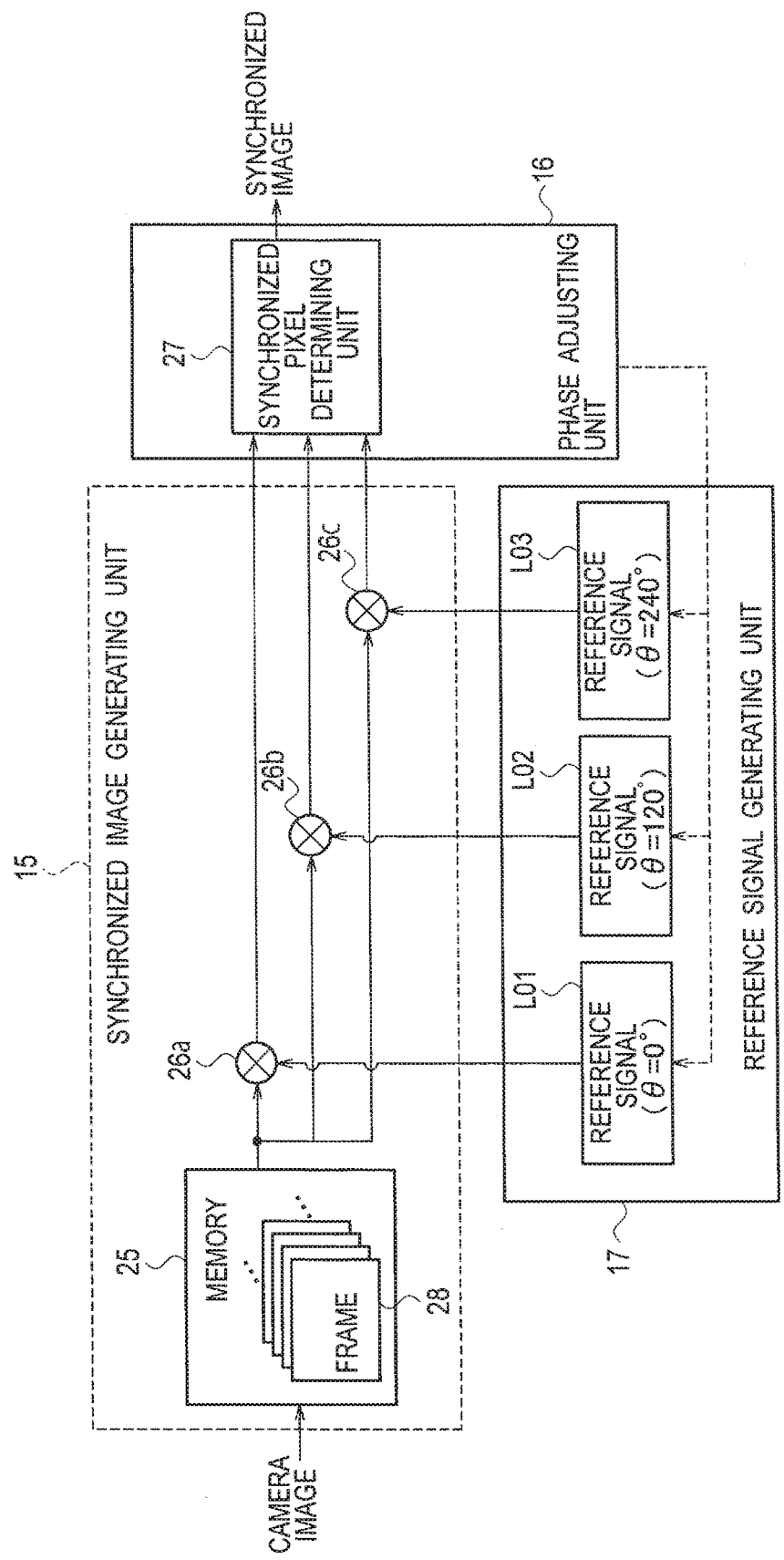
FIG. 2 is a block diagram illustrating a detailed configuration of a reference signal generating unit 17, a synchronized image generating unit 15, and a phase adjusting unit 16.
Figure 3:
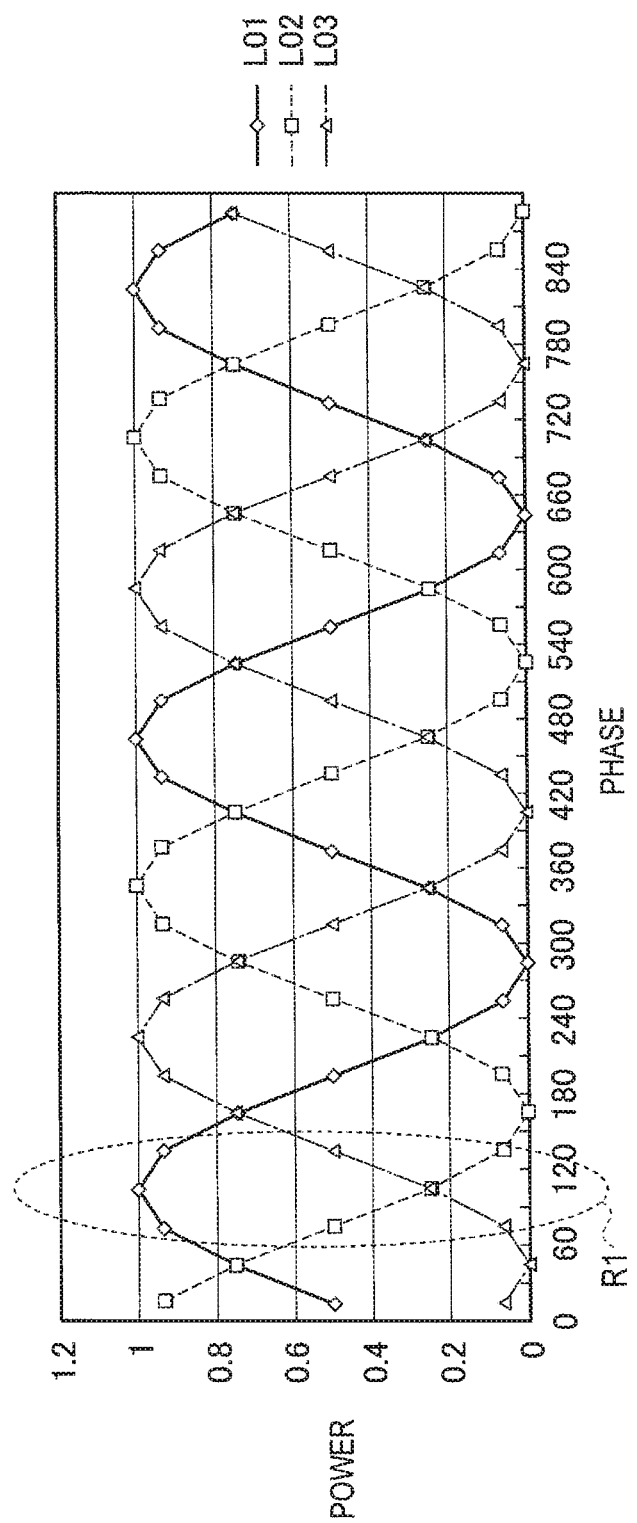
FIG. 3 is a graph illustrating an example of three reference signals (L01, L02, L03) set by the reference signal generating unit 17.

With reference to FIG. 2, detailed configurations of the reference signal generating unit 17, the synchronized image generating unit 15, and the phase adjusting unit 16 will be described. The reference signal generating unit 17, for example, sets three reference signals (L01, L02, L03) the phases of which are shifted each other by a time obtained by dividing the cycle of the alternating current power supplied to the traffic lights by three. The cycles of the reference signals (L01, L02, L03) are equal to that of the alternating current power supplied to the traffic lights but the phases thereof are different. With respect to the reference signal L01, the phase of the reference signal L02 is shifted by 120°, and the phase of the reference signal L03 is shifted by 240°. An example of the reference signals (L01, L02, L03) is illustrated in FIG. 3.

The synchronized image generating unit 15 includes a memory 25 and multiplying units (26$a$, 26$b$, 26$c$). The memory 25 stores a series of multiple camera images (frames) 28 at a time. For example, the memory 25 stores the multiple camera images 28 at a time which are captured during one alternating current cycle of the electric power supplied to the traffic lights. The multiplying units (26$a$, 26$b$, 26$c$) multiply a luminance signal of each pixel of the camera images read out from the memory 25 and each of the reference signals (L01, L02, L03) together, and generate three synchronized images (G01, G02, G03). The multiplying units 26 perform the above multiplication for each of the multiple camera images stored at the same time in the memory 25.

The phase adjusting unit 16 includes a synchronized image determining unit 27 which determines the synchronized image having the highest detection output value out of the three synchronized images (G01, G02, G03) generated by the multiplication with the reference signals (L01, L02, L03), respectively. A detection output value is, for example, the average value of the luminance of a synchronized pixel.

When the phase of a reference signal is matched to that of the alternating current power supplied to the traffic lights, the luminance value of a synchronized pixel and the average value (detection output value) of the luminance of the synchronized pixel are the largest values. On the other hand, the more the phase of the reference signal shifts from that of the electric power supplied to the traffic lights, the smaller the luminance value of the synchronized pixel and the average value (detection output value) of the luminance of the synchronized pixel will become. Therefore, it can be judged that the synchronized image having the largest detection output value among the three synchronized images (G01, G02, G03) has been generated using the reference signal having the phase which is closest to that of the electric power supplied to the traffic lights.

Thus, by the synchronized image determining unit 27 determining the synchronized image having the largest detection output value out of the three synchronized images (G01, G02, G03), the phase adjusting unit 16 can select the reference signal L01 having the phase which is closest to that of the alternating current power, out of the three reference signals (L01, L02, L03). For example, the FIG. 4(*a*) illustrates an example of the luminance variations of the synchronized images (G01, G02, G03). Among the synchronized images (G01, G02, G03), the detection output value of the synchronized image G01 is larger than the other synchronized images (G02, G03). In this case, the synchronized image determining unit 27 selects the synchronized image G01 as a synchronized image having the largest detection output value. It can be judged that the phase of the alternating current power supplied to the traffic lights is positioned at the area R1 in FIG. 3.

The phase adjusting unit 16 adjusts the phases of the three reference signals such that the detection output values of the synchronized images using the other unselected reference signals are equal to each other, the phases of which are shifted by an equal amount from the selected reference signal in the positive and negative directions. This makes it possible to adjust the phase of the selected reference signal to that of the alternating current power.

In the embodiment, as an example of reference signals the number of which is the multiple of three, the three reference signals (L01, L02, L03) are set, and the reference signal L01 is selected. The other reference signals the phases of which are shifted by an equal amount from the reference signal L01 in the positive and negative directions are the reference signals (L02, L03). The synchronized images obtained by performing the detection process for the camera images using the reference signals (L02, L03) are the two synchronized images (G02, G03).

Accordingly, the phase adjusting unit 16 shifts each phase of the three reference signals (L01, L02, L03) by an equal amount of time such that the detection output values of the two unselected synchronized images (G02, G03) become equal to each other. This makes it possible for the phase adjusting unit 16 to adjust the phase of the selected reference signal L01 to that of the alternating current power supplied to the traffic lights. As a result, the detection output value of the synchronized image G01 for which the detection process is performed using the reference signal L01 becomes largest, and the range of the luminance variation of the synchronized image G01 also becomes largest.

For example, in the example illustrated in FIG. 4(*a*), the detection output values of the two unselected synchronized images (G02, G03) are different from each other. The phase adjusting unit 16 advances the phases of the reference signals (L01, L02, L03) by 40°. Then, the multiplying units (26*a*, 26*b*, 26*c*) perform the synchronization detection process again using the reference signals (L01, L02, L03) after the phase adjustment has been made. The result is illustrated in FIG. 4(*b*). In the example illustrated in FIG. 4(*b*), the detection output values of the unselected synchronized images (G02, G03) are equal to each other. In this case, the phase of the selected reference signal L01 matches the phase of the alternating current power supplied to the traffic lights, and the detection output value of the synchronized image G01 obtained from the detection process using the reference signal L01 and the range of the luminance variation of the synchronized image G01 are largest.

As the distance from the vehicle to a traffic light becomes longer, the luminance of a signal lamp detected by the image capturing unit 11 becomes lower, and the range of the luminance variation becomes smaller. To deal with this, by bringing the phase of the reference signal close to that of the luminance variation of the signal lamp, that is, the phase of the electric power supplied to the traffic light, it is possible to obtain a high detection output value, which in turn makes it possible to detect the distant traffic light with high accuracy.

Next, with reference to FIGS. 8 and 9, a modification of the phase adjusting unit 16 will be described. For detection output values of the synchronized images (G02, G03) used for the phase adjustment, detection output values obtained by performing the detection process on an area in the camera images, which area has the largest range of the luminance variation, may be used.

Figure 8A:
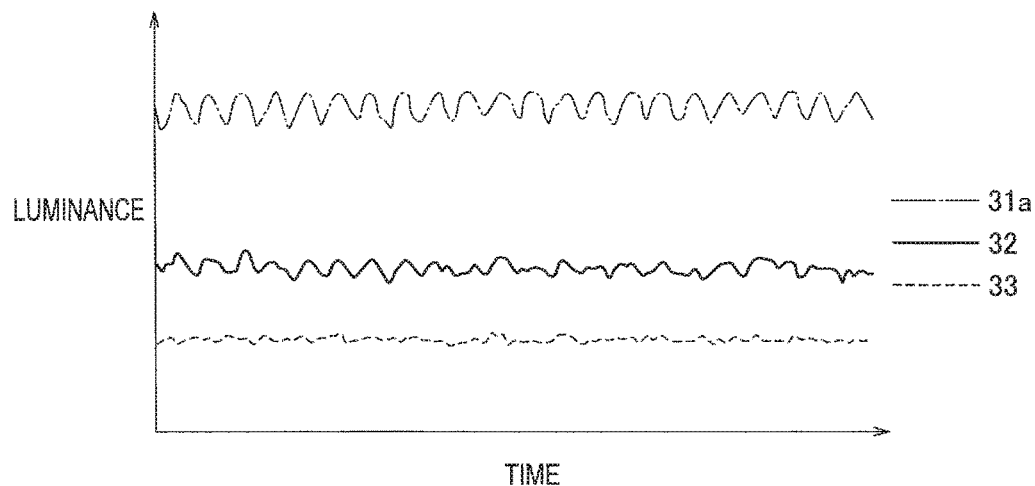
FIG. 8(a) is a graph illustrating a difference in the range of the luminance variation depending on a distance from a vehicle.
Figure 8B:
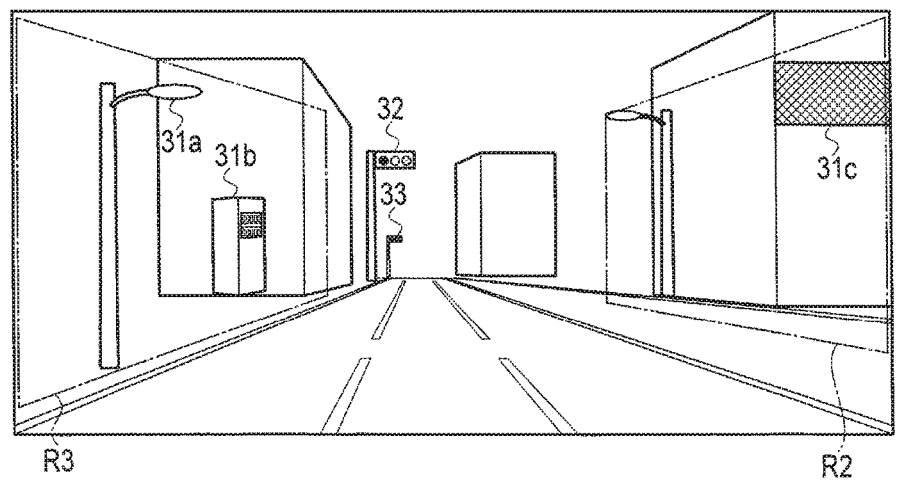
FIG. 8(b) is a diagram illustrating a streetlight 31a, a vending machine 31b, and a signboard 31c as examples of electric lights located in the vicinity of the vehicle, and illustrating traffic lights 32 and 33 distant from the vehicle.
Figure 9:
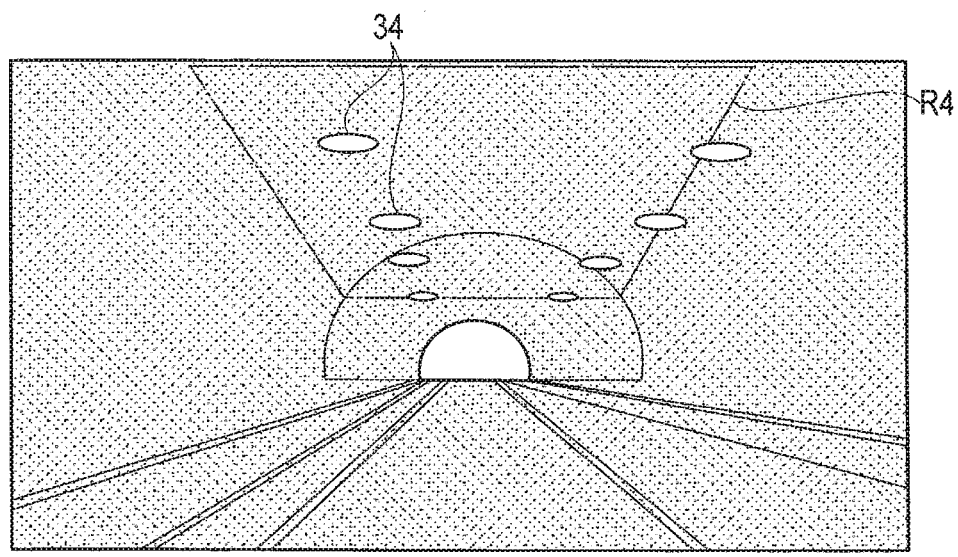
FIG. 9 is a diagram illustrating an example of a camera image captured when the vehicle is travelling in a tunnel.

FIG. 8(*a*) is a graph illustrating the difference in the range of the luminance variation depending on a distance from the vehicle, and FIG. 8(*b*) is a diagram illustrating a streetlight 31*a*, a vending machine 31*b*, and a signboard 31*c* as examples of electric lights located in the vicinity of the vehicle and also illustrating traffic lights 32 and 33 distant from the vehicle. FIG. 8(*a*) illustrates the luminance variations of the streetlight 31*a*, and the traffic lights 32 and 33 illustrated in FIG. 8(*b*). The ranges of the luminance variations of the electric lights (the streetlight 31*a*, the vending machine 31*b*, and the signboard 31*c*) located in the vicinity of the vehicle are larger than those of the distant traffic lights (32, 33). In addition, the larger the range of the luminance variation is, the larger the variation range of the detection output value obtained by the phase shift is. Thus, the accuracy in the phase adjustment is improved. For this reason, the phase adjusting unit 16 may use a detection output value obtained by performing the detection process on an area in the camera images, which area has the largest range of the luminance variation.

For example, the phase adjusting unit 16 judges the road condition from the current vehicle position and map information of the area around the vehicle which can be obtained from a GPS device and a map database. For example, the phase adjusting unit 16 judges whether the road shape in the traveling direction of the vehicle is a straight line as illustrated in FIG. 8(*b*), or a curve to the right or the left. The phase adjusting unit 16 also judges whether or not the vehicle is travelling in a tunnel as illustrated in FIG. 9.

The phase adjusting unit 16 sets an image area in each camera image based on the road condition judged. For example, when the road shape is a straight line, the phase adjusting unit 16 sets areas (R2, R3) in which the road shoulders of the road are captured, in the camera images as image areas as illustrated in FIG. 8(*b*). This makes the image areas to include the electric lights (31*a*, 31*b*, 31*c*) located at the road shoulders of the road. Additionally, when the vehicle is traveling in a tunnel, the phase adjusting unit 16 sets in the camera images an area R4 in which illumination lamps 34 installed on an inner wall of the tunnel are captured, as an image area as illustrated in FIG. 9.

Then, the phase adjusting unit 16 may perform the phase adjustment described above using the detection output values obtained by performing the detection process on the image areas (R2 to R4) of the camera images. The phase of the reference signals can be adjusted with high accuracy. Specifying the image areas (R2 to R4) on which the synchronization detection process to be performed in advance as described above reduces the computational load of the synchronization detection process and improves the processing speed.

Alternatively, the phase adjusting unit 16 may select a pixel having the largest range of the luminance variation from all the pixels in the camera images and use the detection output value obtained by performing the detection process on the selected pixel. This makes it possible to adjust the phase of the reference signals with high accuracy without specifying an image area.

The phase adjusting unit 16 may use the detection output value obtained by performing the detection process on the area in which the range of the luminance variation is the largest of the image, as described above. Here, "the area in which the range of the luminance variation is the largest of the image" includes the image areas (R2 to R4) described above and the pixels selected by the phase adjusting unit 16.

Figure 5:
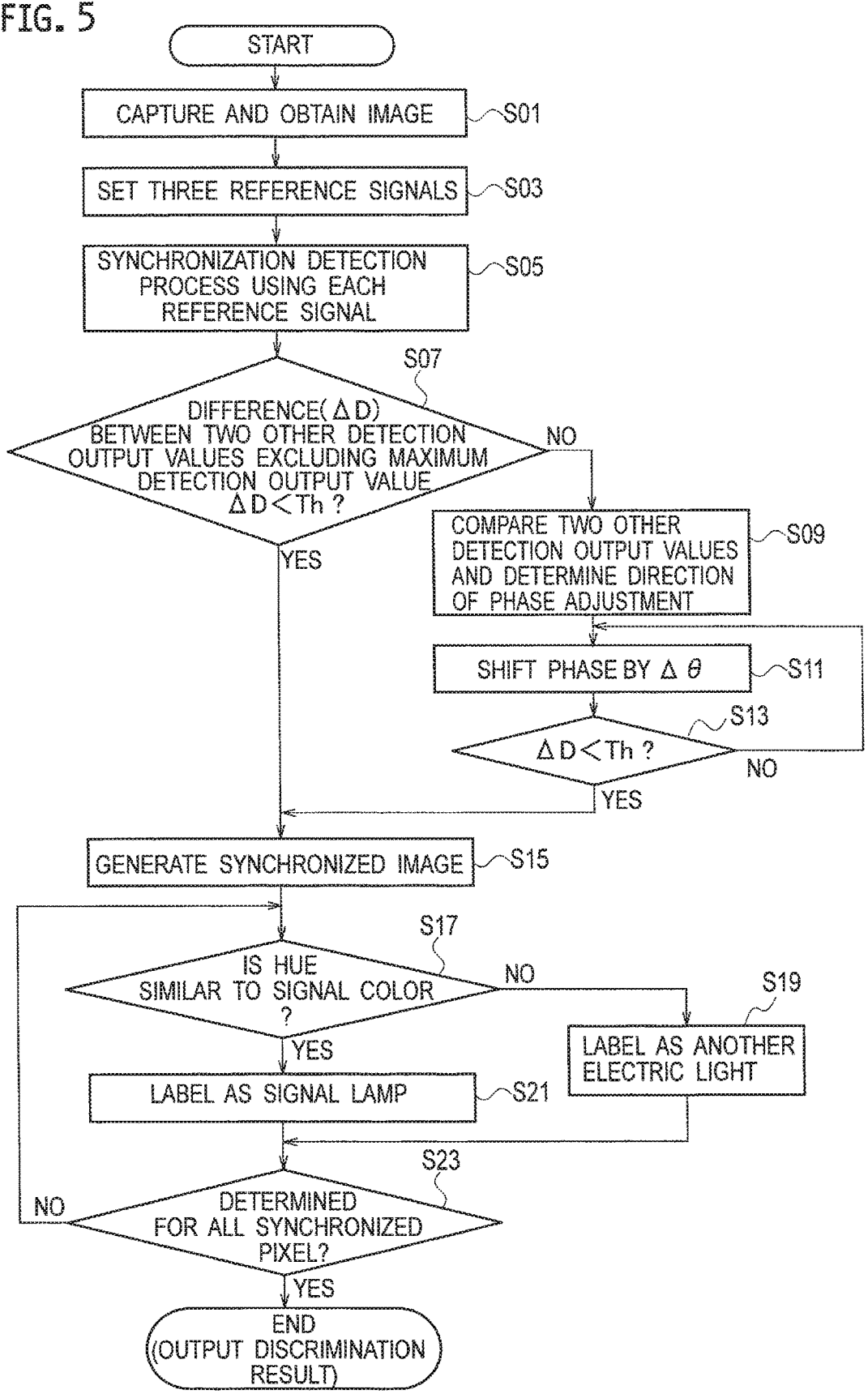
FIG. 5 is a flowchart illustrating an example of a traffic light detecting method using the traffic light detecting device illustrated in FIG. 1.

Next, an example of a traffic light detecting method using the traffic light detecting device illustrated in FIG. 1 will be described with reference to FIG. 5. The operation of the traffic light detecting device illustrated in the flowchart of [[FIG. 6]] FIG. 5 starts as soon as the ignition switch of a vehicle turns on and the traffic light detecting device is activated, and it is repeatedly executed until the traffic light detecting device stops.

In step S01, the image capturing unit 11 repeatedly captures images of the surroundings of the vehicle and obtains a series of the multiple camera images. The image capturing unit 11 captures the images multiple times during one cycle of the alternating current power supplied to the traffic lights. The obtained image data are transferred to the synchronized image generating unit 15 and temporarily stored in the memory 25.

In step S03, the reference signal generating unit 17 sets the three reference signals (L01, L02, L03) the phases of which are shifted each other by a time obtained by dividing the cycle of the alternating current power supplied to the traffic lights by three, as illustrated in FIG. 3.

In step S05, the synchronized image generating unit 15 performs the synchronization detection process of multiplying each of the three reference signals (L01, L02, L03) set in step S03 and the luminance signal of each pixel of the camera images together. From this process, the synchronized images (G01, G02, G03) synchronized with the reference signals (L01, L02, L03) respectively are generated.

In step S07, the synchronized image determining unit 27 selects the synchronized image (G01) having the largest detection output value out of the three synchronized images (G01, G02, G03). The synchronized image determining unit 27, then, judges whether or not the difference ($\Delta D$) between the detection output values of the remaining two synchronized images (G02, G03) is smaller than a predetermined threshold value (Th). When the difference ($\Delta D$) between the detection output values is smaller than the predetermined threshold value (Th) (YES in S07), the synchronized image determining unit 27 judges that the phase adjustment is not necessary because the phase of the reference signal L01 matches that of the alternating current power, and the processing proceeds to step S15.

On the other hand, when the difference ($\Delta D$) between the detection output values is larger than or equal to the predetermined threshold value (Th) (NO in S07), the synchronized image determining unit 27 judges that the phase adjustment is necessary because there is a deviation between the phase of the reference signal L01 and that of the alternating current power, and the processing proceeds to step S09. The phase adjusting unit 16 compares the detection output values of the unselected two synchronized images (G02, G03) and determines the direction of the phase adjustment. The processing proceeds to step S11, where the phase adjusting unit 16 shifts the phases of the reference signals (L01, L02, L03) by a predetermined shift amount ($\Delta \theta$) in the direction of the phase adjustment. The processing proceeds to step S13, where the synchronized image determining unit 27 determines whether or not the difference ($\Delta D$) between the detection output values is smaller than the predetermined threshold value (Th) in the same way as step S07. The phase adjusting unit 16 repeats the phase shifting processes (S11, S13) until the difference ($\Delta D$) between the detection output values becomes smaller than the predetermined threshold value (Th).

Specifically, by shifting the phases from the selected reference signal L01 in the direction of the reference signal either of the two unselected reference signals (L02, L03), with which a larger detection output value has been made, it is possible to make the detection output values of the unselected synchronized images equal to each other. In the example in FIG. 4(a), the detection output value of the synchronized image G03 is larger than that of the synchronized image G02. Therefore, by shifting the phases in the direction from the reference signal L01 toward the reference signal L03, it is possible to make the difference ($\Delta D$) between the detection output values smaller than the predetermined threshold (Th) as illustrated in FIG. 4(b).

As described above, in the embodiment, the phase of the selected reference signal L01 is adjusted to that of the luminance variation of a signal lamp by using the detection output values of the unselected two synchronized images (G02, G03).

After the phase adjustment is completed, the processing proceeds to step S15, where the synchronized image generating unit 15 performs the synchronization detection process of multiplying the camera images and the reference signal L01 after the phase adjustment has been made together. This makes it possible to extract a synchronized pixel with a luminance which varies in synchronization with the reference signal having the phase adjusted to the phase of the alternating current power, from the camera images with high sensitivity.

The processing proceeds to step S17, where the traffic light judging unit 18 judges whether or not the hue of the synchronized pixel extracted by the synchronized image generating unit 15 is similar to that of a signal color. If the hue of the synchronized pixel is similar to that of a signal color, it is possible to judge that a traffic light is present at the position of the synchronized pixel. Therefore, the processing proceeds to S21, and the traffic light judging unit 18 labels the synchronized pixel as a traffic light. On the other hand, if the hue of the synchronized pixel is not similar to the hue of a signal color (NO in S17), it is possible to judge that one of other electric lights is present at the position of the synchronized pixel instead of a signal lamp. Therefore, the processing proceeds to S19, and the traffic light judging unit 18 labels the synchronized pixel as one of other electric lights.

The processing proceeds to step S23, where the traffic light judging unit 18 judges whether or not the judgments have been made for all the synchronized pixels extracted in step S15 on whether or not each pixel indicates a traffic light.

If all the judgments have not finished yet (NO in S23), the processing returns to step S17, and the hue judging processes (S17 to S21) are performed for the remaining synchronized pixels. If all the judgments have finished (YES in S23), the processing in the flowchart in FIG. 5 ends.

As described above, the following operation and effect can be obtained according to the embodiment.

Figure 6A:
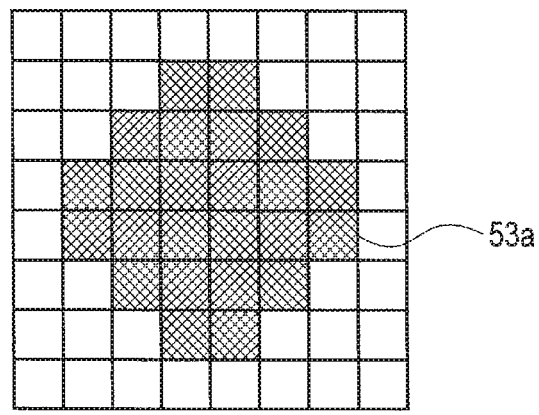
FIG. 6(a) is a diagram indicating the necessary size of a pixel group 53a to detect a candidate for a signal lamp from the circularity.
Figure 6B:
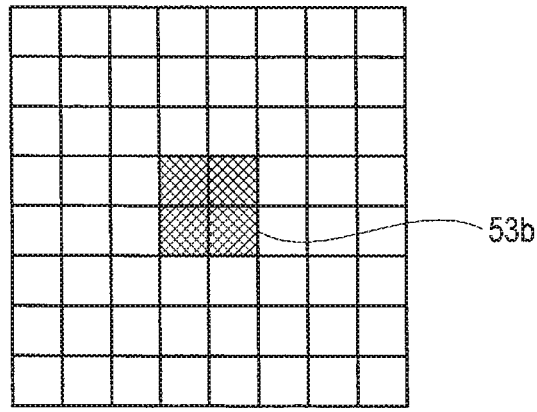
FIG. 6(b) is a diagram indicating the number of synchronized pixels 53b which can be detected in the embodiment.

According to Patent Literature 1, an area with a hue similar to that of a signal lamp is extracted from camera images, and a candidate for a signal lamp is detected based on the circularity of the extracted area. When circularity is used to judge whether or not a signal lamp is present, the area (pixel group 53*a*) needs to include about the same number of pixels as illustrated in FIG. 6(*a*). On the other hand, in the traffic light detecting device according to the embodiment, for a traffic light located too far to detect the phase and the cycle thereof, and the range of the luminance variation of the traffic light is small, reference signals the number of which is a multiple of three are set, and the phase of the reference signal which is closest to the phase of the alternating current power is selected and adjusted to the alternating current cycle, as described above. As a result, it is possible to quickly extract a synchronized pixel with a luminance that varies in synchronization with the alternating current cycle of the electric power supplied to the traffic lights, as a candidate of a signal lamp. This makes it possible to judge whether or not the synchronized pixels 53*b* are indicating a signal lamp, even though the number of the synchronized pixels 53*b* is too small to judge the circularity as illustrated in FIG. 6(*b*). In other words, the traffic light detecting device according to the embodiment detects a distant traffic light with high accuracy.

By extracting out of the camera images the synchronized pixels with a luminance which varies in synchronization with the cycle of the alternating current power supplied to the traffic lights, it is possible to detect a traffic light without considering the size or the shape of the signal lamp. Accordingly, it is possible to detect even a distant traffic light with high accuracy, even though the image size of the traffic light is too small to determine the circularity.

Since the alternating current power supplied to the traffic lights is a three-phase alternating current power, the phase of the alternating current power varies depending on a transformer facility. For this reason, reference signals the number of which is a multiple of three and the phases of which are shifted each other by a time obtained by dividing the cycle of the alternating current power by the multiple of three are set, and the phase of a reference signal which is closest to the phase of the alternating current power is selected and adjusted to the phase of the alternating current power. As a result, it is possible to extract a synchronized pixel the luminance variation of which is small with high sensitivity by using the reference signal matched to the phase of the alternating current power supplied to the traffic lights. Thus, it is possible to detect even a distant traffic light the luminance variation of which is small.

The phase of a three-phase alternating current power may be shifted by a time obtained by dividing the cycle of the alternating current power by three depending on the conditions of the transformer facility and the like. In the embodiment, the reference signal generating unit 17 selects reference signals the number of which is a multiple of three and the phases of which are shifted each other by a time obtained by dividing the cycle of the alternating current power by the multiple of three. When the phase of the alternating current power supplied to traffic lights in the area around the vehicle changes by the vehicle traveling, the reference signals are switched among the reference signals the number of which is the multiple of three and which have been set by the reference signal generating unit 17. This makes it possible to select a reference signal corresponding to the phase of the alternating current power after the change without the phase adjustment by the phase adjusting unit 16.

The phase adjusting unit 16 shifts each phases of the three reference signals (L01, L02, L03) by an equal amount of time such that the detection output values obtained by performing the detection process on the camera images using each of the other reference signals (L02, L03) become equal to each other, the phases of the other reference signals (L02, L03) being shifted by an equal amount from the selected reference signal L01 in the positive and negative directions. This makes it possible to adjust the phase of the selected reference signal L01 to that of the alternating current power. As a result, the detection output value of the synchronized image G01 for which the detection process is performed using the reference signal L01 becomes largest, and the range of the luminance variation of the synchronized image G01 also becomes largest.

The phase adjusting unit 16 may perform the phase adjustment using the detection output value obtained by performing the detection process on an area in the camera images, which area has the largest range of the luminance variation. The larger the range of the luminance variation is, the larger the variation range of the detection output value obtained by the phase shift is. Thus, the accuracy in the phase adjustment is improved.

The phase adjusting unit 16 may use the detection output value obtained by performing the detection process on the areas in which the road shoulders of the road are captured in the camera images. The ranges of the luminance variations of electric lights located on road shoulders on the road, including a signboard, a vending machine, and a streetlight, are larger than that of a distant traffic light. Therefore, the phase adjusting unit 16 uses the detection output values obtained by performing the detection process on the areas (R2, R3) in the camera images, in which the road shoulders are captured. This makes it possible to adjust the phase of the selected reference signal to that of the alternating current power with high accuracy.

When the vehicle is traveling in a tunnel, there are generally illumination lamps installed on an inner wall of the tunnel instead of electric lights including a signboard, a vending machine, and a streetlight on the road shoulders of the road. Therefore, the phase adjusting unit 16 may use the detection output value obtained by performing the detection process on the area R4 in the camera images, in which the illumination lamps 34 installed on the inner wall of the tunnel are captured. This makes it possible to adjust the phase of the selected reference signal to that of the alternating current power with high accuracy.

Although the embodiment of the present invention has been mentioned as described above, one should not understand that the statements and the drawings as part of the disclosure limit the present invention. From this disclosure, various modified embodiments, examples, and operation techniques will be apparent to those who skilled in the art.

The three reference signals (L01, L02, L03) the phases of which are shifted each other by a time obtained by dividing the cycle of the alternating current power by three are exemplified as "the reference signals the number of which is a multiple of three and the phases of which are shifted each other by a time obtained by dividing the cycle of the alternating current power supplied to the traffic lights by the multiple of three". The number of reference signals may be, of course, six, nine, twelve, and so on, besides three.

Figure 7:
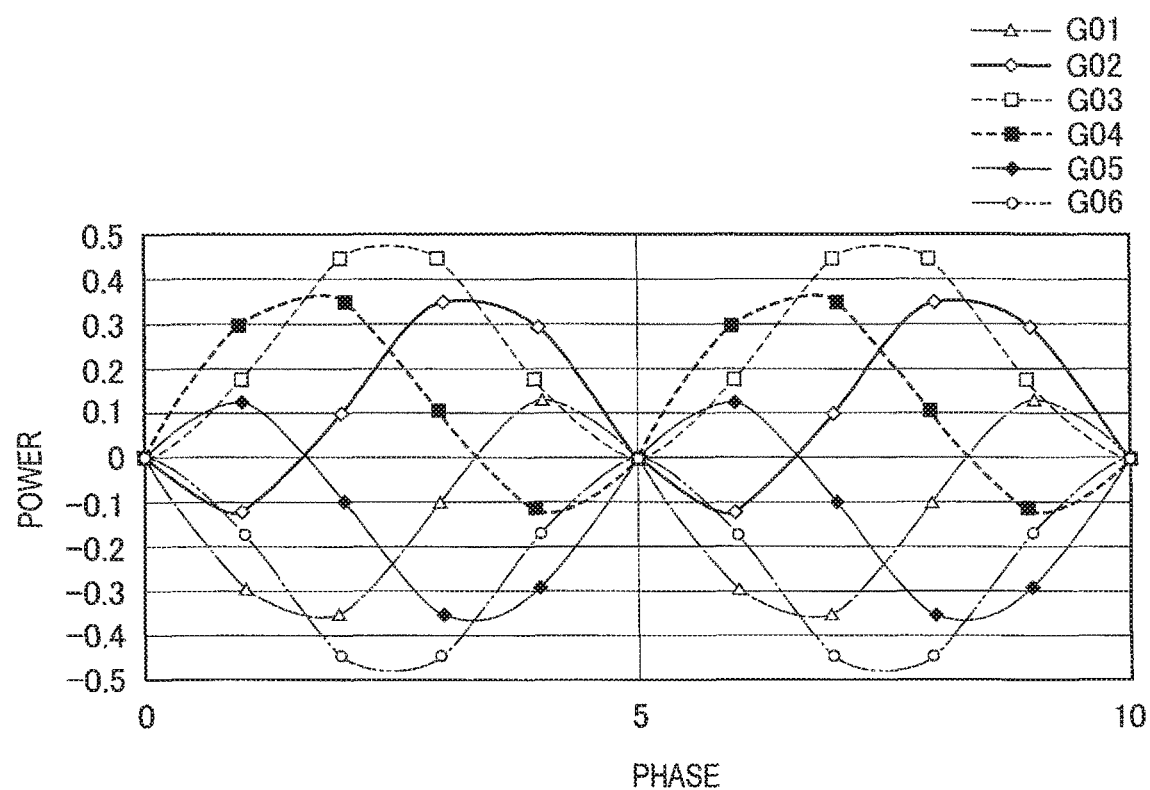
FIG. 7 is a graph illustrating an example of detection output values of six synchronized images (G01 to G06) each obtained from six reference signals.

FIG. 7 illustrates an example of the detection output values of six synchronized images (G01 to G06) each obtained from six reference signals. Of the six synchronized images, the detection output value of the synchronized image G03 is the largest. In addition, the detection output values corresponding to pairs of other reference signals the phases of which are shifted by an equal amount in the positive and negative directions from the reference signal corresponding to the synchronized image G03 are almost equal to each other. Specifically, the detection output values of G02 and G04 are almost equal, and the detection output values of G01 and G05 are almost equal. Therefore, in the example of FIG. 7, it can be judged that the reference signal corresponding to the synchronized image G03 is matched to the phase of the alternating current power.

REFERENCE SIGNS LIST 11 image capturing unit
12 traffic light detecting unit
15 synchronized image generating unit (synchronized pixel extracting unit)
16 phase adjusting unit
17 reference signal generating unit
18 traffic light judging unit
28 camera image (image)
33, 32 traffic light
53b synchronized pixel
R2 to R4 image area
L01, L02, L03 reference signal

The invention claimed is:

1. A traffic light detecting device comprising:
    a camera mounted on a vehicle and configured to capture an image of surroundings of the vehicle; and
    a traffic light detecting circuit configured to detect a traffic light from the image, wherein
    the traffic light detecting circuit includes:
        a reference signal generating unit configured to set reference signals the number of which is a multiple of three, and phases of which are shifted each other by a time obtained by dividing a cycle of an alternating current power supplied to the traffic light by the multiple of three,
        a phase adjusting unit configured to select, from the reference signals the number of which is the multiple of three, a reference signal having a phase closest to a phase of the alternating current power, and adjust the phase of the reference signal to the phase of the alternating current power,
        a synchronized pixel extracting unit configured to extract from the image a synchronized pixel with a luminance which varies in synchronization with the reference signal having the phase adjusted to the phase of the alternating current power, and
        a traffic light judging unit configured to judge from the synchronized pixel whether or not the traffic light is present.

2. The traffic light detecting device according to claim 1, wherein
    the synchronized pixel extracting unit extracts synchronized images respectively using other reference signals phases of which are shifted by an equal amount from the selected reference signal in positive and negative directions, and
    the phase adjusting unit adjusts the phases of the reference signals the number of which is the multiple of three such that detection output values of the synchronized images using the other reference signals become equal to each other.

3. The traffic light detecting device according to claim 2, wherein
    the phase adjusting unit obtains the detection output values by performing a detection process on an area at which a range of a luminance variation is largest in the image.

4. The traffic light detecting device according to claim 2, wherein
    the phase adjusting unit obtains the detection output values by performing detection process on an area in which a road shoulder is captured, in the image.

5. The traffic light detecting device according to claim 2, wherein
    when the vehicle is traveling in a tunnel, the phase adjusting unit obtains the detection output values by performing the detection process on an area in which an illumination lamp installed on an inner wall of the tunnel is captured, in the image.

6. The traffic light detecting device according to claim 1, wherein
    the traffic light judging unit includes a hue judging unit configured to judge whether or not a hue of the synchronized pixel is similar to a hue of a signal color, and
    the traffic light judging unit judges that the traffic light is present at a position of the synchronized pixel when the hue of the synchronized pixel is similar to the hue of the signal color.

7. A traffic light detecting method, comprising:
    capturing an image in a travelling direction of a vehicle;
    setting reference signals the number of which is a multiple of three, and phases of which are shifted each other by a time obtained by dividing a cycle of an alternating current power supplied to a traffic light by the multiple of three;
    selecting, from the reference signals the number of which is the multiple of three, a reference signal having a phase closest to a phase of the alternating current power, and adjust the phase of the reference signal to the phase of the alternating current power;
    extracting from the image a synchronized pixel with a luminance which varies in synchronization with the reference signal having the phase adjusted to the phase of the alternating current power; and
    judging from the synchronized pixel whether or not the traffic light is present.

* * * * *